(12) United States Patent
Lee et al.

(10) Patent No.: US 10,004,089 B2
(45) Date of Patent: Jun. 19, 2018

(54) METHOD AND APPARATUS FOR CONTROLLING RANDOM ACCESS OPPORTUNITY IN MOBILE COMMUNICATION SYSTEM

(71) Applicant: Electronics and Telecommunications Research Institute, Daejeon (KR)

(72) Inventors: Changhee Lee, Seoul (KR); Taesoo Kwon, Hwaseong-si Gyeonggi-do (KR); Jae Heung Kim, Daejeon (KR); Jung-Im Kim, Daejeon (KR); Ok-Sun Park, Daejeon (KR); JaeSheung Shin, Daejeon (KR); Sung-Min Oh, Daejeon (KR); Hyun-yong Hwang, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 56 days.

(21) Appl. No.: 15/192,328

(22) Filed: Jun. 24, 2016

(65) Prior Publication Data

US 2016/0381715 A1 Dec. 29, 2016

(30) Foreign Application Priority Data

Jun. 24, 2015 (KR) ......................... 10-2015-0090054
Jun. 30, 2015 (KR) ......................... 10-2015-0093683
Jun. 23, 2016 (KR) ......................... 10-2016-0078731

(51) Int. Cl.
*H04W 4/00* (2018.01)
*H04W 74/08* (2009.01)
*H04W 74/00* (2009.01)

(52) U.S. Cl.
CPC ...... *H04W 74/0841* (2013.01); *H04W 74/006* (2013.01)

(58) Field of Classification Search
None
See application file for complete search history.

(56) References Cited

U.S. PATENT DOCUMENTS

| 8,027,356 | B2 | 9/2011 | Lee et al. |
| 9,380,605 | B1* | 6/2016 | Lee .................. H04W 74/0833 |
| 2010/0278131 | A1 | 11/2010 | Jeong et al. |

(Continued)

FOREIGN PATENT DOCUMENTS

| KR | 1020100118919 A | 11/2010 |
| KR | 1020140033220 A | 3/2014 |
| KR | 1020150084727 A | 7/2015 |

OTHER PUBLICATIONS

Sung Min Oh et al., "Proposed Solutions for Massive Connectivity", The Magazine of the IEIE, Apr. 2016, pp. 300-307, vol. 43, No. 4.

*Primary Examiner* — Minh-Trang Nguyen
(74) *Attorney, Agent, or Firm* — William Park & Associates Ltd.

(57) ABSTRACT

A base station infers a random access failure rate depending on a random access collision of terminals performing random access and controls a random access opportunity of a terminal that fails the random access by using the random access failure rate of each terminal. Also, information for the controlled random access opportunity is transmitted to the terminal that fails the random access.

18 Claims, 20 Drawing Sheets

(56) References Cited

U.S. PATENT DOCUMENTS

| | | | |
|---|---|---|---|
| 2012/0008575 A1* | 1/2012 | Vujcic | H04W 74/002 |
| | | | 370/329 |
| 2012/0163311 A1 | 6/2012 | Park | |
| 2012/0250662 A1* | 10/2012 | Kuo | H04W 4/20 |
| | | | 370/336 |
| 2013/0039274 A1 | 2/2013 | Lee | |
| 2013/0039308 A1 | 2/2013 | Lee | |
| 2013/0148607 A1* | 6/2013 | Yu | H04W 8/186 |
| | | | 370/329 |
| 2013/0182680 A1 | 7/2013 | Choi et al. | |
| 2013/0286958 A1* | 10/2013 | Liang | H04W 74/0866 |
| | | | 370/329 |
| 2014/0036847 A1 | 2/2014 | Kyeong-In et al. | |
| 2014/0206343 A1* | 7/2014 | Immendorf | H04K 3/226 |
| | | | 455/423 |
| 2015/0289141 A1* | 10/2015 | Ghasemzadeh | H04W 16/14 |
| | | | 370/330 |

* cited by examiner

METHOD AND APPARATUS FOR CONTROLLING RANDOM ACCESS OPPORTUNITY IN MOBILE COMMUNICATION SYSTEM

CROSS-REFERENCE TO RELATED APPLICATION

This application claims priority to and the benefit of Korean Patent Application Nos. 10-2015-0090054, 10-2015-0093683, and 10-2016-0078731 filed in the Korean Intellectual Property Office on Jun. 24, 2015, Jun. 30, 2015, and Jun. 23, 2016, the entire contents of which are incorporated herein by reference.

BACKGROUND OF THE INVENTION (a) Field of the Invention

The present invention relates a method and an apparatus controlling a random access opportunity in a mobile communication system. More particularly, the present invention relates to a method and an apparatus controlling a random access opportunity that improves a random access success rate in a mobile communication system.

(b) Description of the Related Art

In a cellular mobile communication system, a random access method to access a terminal to a base station (network) is supported. In a long term evolution (LTE) system, the terminal performs the random access to obtain uplink synchronization or to receive an allocation of a cell radio network temporary identifier (C-RNTI) that is a unique identifier of the terminal.

However, when a plurality of terminals perform the random access, a random access success rate of the terminal is rapidly decreased by a collision generated during the random access, and a terminal may not normally access a base station.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention is to provide a method and an apparatus for controlling a random access opportunity in a mobile communication system to increase the random access success rate of the terminal when a plurality of terminals perform the random access in the mobile communication system.

According to an exemplary embodiment of the present invention, a method of controlling a random access opportunity for random access of a terminal to a base station is provided. The random access opportunity control method includes: a step of inferring a random access failure rate according to a random access collision of terminals performing random access; a step of controlling a random access opportunity of the terminal that fails the random access by using the random access failure rate of each terminal; and a step of transmitting information for the controlled random access opportunity to the terminal that fails the random access.

The controlling step may include a step of changing at least one among a value of the random access preamble, a number of random access preambles, and a random access resource.

The inferring step may include: a step of inferring a collision probability of the random access preamble transmitted by each terminal; and a step of inferring the random access failure rate of each terminal based on the collision probability of the random access preamble transmitted by each terminal.

The inferring step may include: a step of transmitting a random access response message to at least one terminal transmitting the successfully detected random access preamble; and a step of inferring the random access failure rate of each terminal by using the resource allocated to transmit the scheduled transmission message by at least one terminal and the scheduled transmission message transmitted through the allocated resource by at least one terminal.

The inferring step may include: a step of allocating the random access preamble for the collision check to each terminal to confirm the random access collision to be transmitted by the terminal that fails the random access; and a step of inferring the random access failure rate of the terminal transmitting the random access preamble for the collision check through the detection of the random access preamble for the collision check.

The inferring step may include: a step of allocating the random access resource for the collision check to each terminal to transmit the random access preamble by the terminal that fails the random access; and a step of inferring the random access failure rate of the terminal transmitting the random access preamble through the detection of the random access preamble in the random access resource for the collision check.

The inferring step may include: a step of receiving the random access failure information from the terminal that fails the random access; and a step of inferring the random access failure rate of the terminal through the random access failure information.

The controlling step may include: a step of calculating the random access transmission rate corresponding to a number of terminals performing the random access by using one random access resource and one random access preamble; and a step of controlling the random access opportunity to minimize the random access failure rate based on the random access transmission rate.

The transmitting step may include: a step of transmitting a paging message including the random access opportunity control indicator representing the random access opportunity control existence to the corresponding terminal; and a step of transmitting a system information message including the control information for how the random access opportunity is controlled to the corresponding terminal.

The transmitting step may include a step of transmitting the system information message including the information for the controlled random access opportunity to the corresponding terminal, and the information for the controlled random access opportunity may include at least one among secondary PRACH configuration information, the random access opportunity control indicator representing the random access opportunity control existence, and the control information for how to control the random access opportunity.

The transmitting step may include a step of adding the information for the controlled random access opportunity to downlink control information (DCI) for the random access response message or the contention resolution message to be transmitted.

The transmitting step may include a step of adding the information for the controlled random access opportunity to the downlink data represented by the DCI that is successfully received by using a predetermined RNTI (radio network temporary identifier).

The transmitting step may include a step of including the information for the random access opportunity with the contention resolution message to be transmitted, and the contention resolution message may further include the identifier of the terminal allowing the access and the uplink resource allocation information.

The random access opportunity control method may further include a step of transmitting classification information to classify the conventional random access opportunity used by the terminal for the random access and the controlled random access opportunity.

The transmitting step of transmitting the classification information may include a step of transmitting the random access response message to at least one terminal transmitting the successfully detected random access preamble, the random access response message may include at least one MAC sub-header and at least one MAC RAR (random access response) indicated by at least one MAC sub-header, and the classification information may expand and represent a reserved bit of the MAC RAR or the MAC sub-header.

The step of transmitting the classification information to each terminal may include: a step of transmitting the random access response message to at least one terminal transmitting the successfully detected random access preamble; and a step of transmitting the downlink control information for the random access response message to at least one terminal, and one of the downlink control information and the MAC sub-header of the random access response message may include the classification information.

The step of transmitting the classification information to each terminal may include: a step of generating an RA-RNTI by using the information for the conventional random access opportunity and the classification information; and a step of scrambling the random access response message by using the RA-RNTI to be transmitted to at least one terminal transmitting the successfully detected random access preamble.

According to another exemplary embodiment of the present invention, an apparatus controlling a random access opportunity for a random access of a terminal in a base station is provided. The random access opportunity control apparatus includes a processor and a transceiver. The processor infers a random access failure rate depending on a random access collision of terminals performing the random access, and controls the random access opportunity of the terminal that fails the random access by using the random access failure rate of each terminal. Also, the transceiver transmits information for the controlled random access opportunity to the terminal that fails the random access.

The processor may calculate the random access transmission rate corresponding to a number of terminals performing the random access by using one random access resource and one random access preamble, and may control the random access opportunity to minimize the random access failure rate based on the random access transmission rate.

The processor may generate classification information to classify the conventional random access opportunity used by the terminal for the random access and the controlled random access opportunity, and the transceiver may transmit the classification information.

DETAILED DESCRIPTION OF THE EMBODIMENTS

Figure 1:
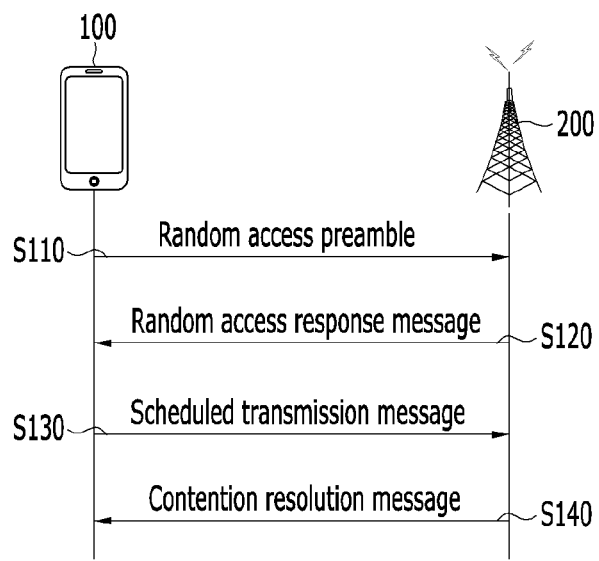
FIG. 1 is a view showing a random access procedure in a mobile communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements.

In the specification, a terminal may represent a mobile terminal (MT), a mobile station (MS), an advanced mobile station (AMS), a high reliability mobile station (HR-MS), a subscriber station (SS), a portable subscriber station (PSS), an access terminal (AT), user equipment (UE), or the like, and may include all or some of the functions of the MT, the MS, the AMS, the HR-MS, the SS, the PSS, the AT, the UE, or the like.

In addition, a base station (BS) may represent an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a base station, a relay node (RN) serving as a base station, an advanced relay station (ARS) serving as a base station, a high reliability relay station (HR-RS) serving as a base station, a small base station [a femto BS, a home node B (HNB), a pico BS, a metro BS, a micro BS, or the like], or the like, and may include all or some of the functions of the ABS, the nodeB, the eNodeB, the AP, the RAS, the BTS, the MMR-BS, the RS, the RN, the ARS, the HR-RS, the small base station, or the like.

Now, a method and an apparatus for controlling a random access opportunity in a mobile communication system according to an exemplary embodiment of the present invention will be described with reference to accompanying drawings.

FIG. 1 is a view showing a random access procedure in a mobile communication system according to an exemplary embodiment of the present invention.

Referring to FIG. 1, a terminal 100 selects one among a random access preamble designated in a base station 200 to be used for a random access, and transmits a random access preamble selected through a physical random access channel (PRACH) defined by the base station 200 ((S110).

If the random access preamble is detected, the base station 200 transmits a random access response message to the terminal 100 (S120). The random access response message may include timing advance (TA) information for the information of the detected random access preamble and the terminal 100 in accordance with uplink synchronization, temporary C-RNTI (TC-RNTI) information allocated to the terminal 100, and uplink resource allocation information.

The terminal 100 receives a position of the PRACH transmitting the random access preamble and a random access response message transmitted by the base station 200 based on the random access preamble. The terminal 100 aligns the uplink synchronization based on the received random access response message, and transmits an uplink transmission message, that is, a scheduled transmission message (S130). Here, the scheduled transmission message may include a unique identifier [an SAE temporary mobile subscriber identity (S-TMSI) or a predetermined value] of the terminal 100 or the TC-RNTI and the information according to a state of the terminal 100.

The base station 200 receives the scheduled transmission message transmitted by the terminal 100.

Two or more terminals may execute the random access by simultaneously using the same PRACH resource and random access preamble, and the base station 200 may receive the scheduled transmission message from two or more terminals through the allocated uplink resource. Accordingly, a contention resolution process is required.

If the scheduled transmission message is received from two or more terminals, the base station 200 selects one among successfully received scheduled transmission messages and transmits a contention resolution message (S140). The contention resolution message may include the unique identifier of the terminal transmitting the selected scheduled transmission message or the TC-RNTI and the uplink resource allocation information.

If the contention resolution message received from the base station 200 is the message corresponding to the unique identifier or the TC-RNTI, the terminal 100 determines the random access success and ends the random access procedure.

On the other hand, if the contention resolution message received from the base station 200 is not the message corresponding to the unique identifier or the TC-RNTI, the terminal 100 determines the random access failure and again executes the random access procedure.

As it is confirmed in the random access procedure, the terminal 100 selects the arbitrary random access preamble and selects one among PRACH resources that can be transmitted to execute the random access. In this case, if the several terminals simultaneously select the same random access preamble and select the same PRACH resource to transmit the random access preamble, a situation that the corresponding terminals are not successfully accessed to the base station 200 by the collision between the random access preambles or the scheduled transmission messages may be generated.

In the environment that the several terminals access the base station 200, a probability of the above-described collision is increased. The terminals that fail the random access by the collision again execute the random access and compete through the random access with the other terminals executing the random access to access the base station 200. That is, the terminals that do not successfully perform the random access by the collision are cumulated such that the collision probability may be rapidly increased.

In this way, the access success probability of the terminal is rapidly decreased by the random access collision when the terminal performs the random access, and the random access success rate is decreased by congestion of the random access. Accordingly, a method for effectively smoothing the collision that may be generated when performing the random access and the congestion due to the collision is required.

To effectively smooth the collision that may be generated in the random access, the base station 200 according to an exemplary embodiment of the present invention controls the random access opportunity such that the terminal 100 may perform the random access. The random access opportunity may mean the random access preamble, or the PRACH that is the random access resource to transmit the random access preamble, or may be used as means including the random access preamble and the random access resource.

Figure 2:
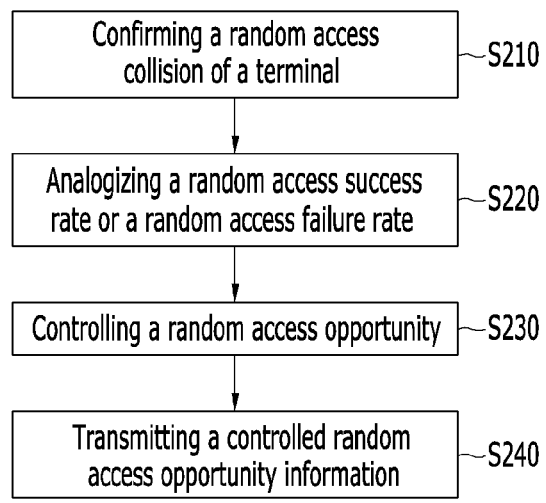
FIG. 2 is a flowchart showing a method for controlling a random access opportunity according to an exemplary embodiment of the present invention.

FIG. 2 is a flowchart showing a method for controlling a random access opportunity according to an exemplary embodiment of the present invention.

Referring to FIG. 2, the base station 200 confirms the random access collision of the terminal to infer the random access success rate or the random access failure rate (S210 and S220).

To control the random access opportunity, it is necessary for the base station 200 to infer the success rate and the failure rate of the random access that is currently performed by the terminals. The base station 200 detects the random access preamble transmitted through the random access resource, and includes the information such as the uplink resource in the random access response message to be transmitted so that the terminal that successfully transmits the detected random access preamble transmits the scheduled transmission message. In this case, if two or more terminals select the same random access resource and transmit the same random access preamble, two or more terminals receive the same random access response message from the base station and allocate the same uplink resource to transmit the scheduled transmission message. Accordingly, the base station 200 receives the scheduled transmission message transmitted by two or more terminals through the allocated uplink resource. The base station 100 may infer the random access success rate or the random access failure rate by considering the random access preamble in the random access procedure of the terminal or the collision that may be generated during the scheduled transmission message transmission. Also, the base station 200 may infer the random access success rate or the random access failure rate through an upper message that is provided by the accessed terminal.

The base station 200 controls the random access opportunity that is available to the terminal so that the plurality of terminals successfully perform the random access procedure (S230). For example, the random access resource may be controlled by changing a configuration of the random access resource, and the terminal may control a number of random access preambles that may be transmitted for the random access as well as the access random access resource. If the random access opportunity that is available in one base station 200 is increased, the collision probability generated in the random access between the terminals is decreased. For example, if the number of random access preambles that are available to the base station 200 is increased, since the terminal selects one among the more random access preambles to perform the random access, the probability of the collision that may be generated by selecting the same random access preamble between the terminals may be decreased. Likewise, when the base station 200 allocates the additional random access resource, the probability that the random access preamble is transmitted to the same random access resource is decreased, thereby reducing the collision that may be generated during the random access. However, when the number of random access preambles is increased, blind decoding complexity to confirm the random access preamble transmission of the terminal in the base station 200 is increased, and when the random access resource is increased, the base station 200 must detect the random access preamble in each random access resource such that the complexity of the base station 200 is increased and the uplink resource for the data transmission of the terminal is decreased. Accordingly, the base station 200 may control the random access opportunity by using the inferred random access success rate or random access failure rate.

The base station 200 transmits the controlled random access opportunity information to the terminal (S240). If the random access opportunity is controlled, the base station may transmit the controlled random access opportunity information existence to the terminal, and the terminal may control the random access opportunity based on the random access opportunity information and may perform the random access based on the controlled random access opportunity.

Next, a method in which the base station 200 infers the random access success rate or the random access failure rate of the terminal will be described in detail with reference to FIG. 3 to FIG. 7.

Figure 3:
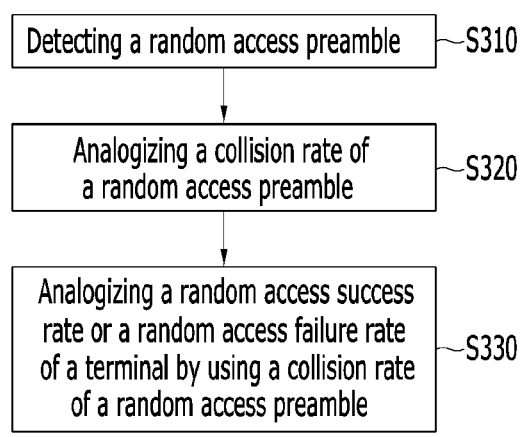
FIG. 3 to FIG. 7 are views showing a method of inferring a random access failure rate of a terminal in a base station according to first to fifth exemplary embodiments of the present invention.

FIG. 3 is a view showing a method of inferring a random access failure rate of a terminal in a base station according to a first exemplary embodiment of the present invention.

Referring to FIG. 3, the base station 200 may infer the random access success rate or the random access failure rate through the random access preamble of the terminal.

When the plurality of terminals transmit the same random access preamble through the same random access resource, the random access preamble transmitted by the different terminals generates the collision with each other. However, when detecting the random access preamble in the base station 200, only the existence of the detection of the random access preamble may be detected.

The base station 200 detects the random access preamble by using intensity of the random access preamble to detect the random access preamble, through a detection metric such as a signal to interference plus noise ratio (SINR) (S310).

The base station 200 sets an additional range to the detection metric to infer the random access collision probability, that is, the collision probability, of the random access preamble (S320). For example, the base station 200 sets a predetermined step to the detection metric used during the detection of the random access preamble to infer the situation that the same random access preamble is transmitted by the plurality of terminals, thereby inferring whether the several same random access preambles are transmitted based on a predetermined threshold value for each step.

The base station 200 may infer the random access success rate or the random access failure rate of the terminal by using the collision probability of the random access preamble (S330). The collision probability of the random access preamble may be inferred through a ratio of the random access preamble in which the collision is detected for the entire random access preamble of which the terminal is selectable, and the random access failure rate may be calculated based on the collision probability and a maximum number of retransmissions.

Figure 4:
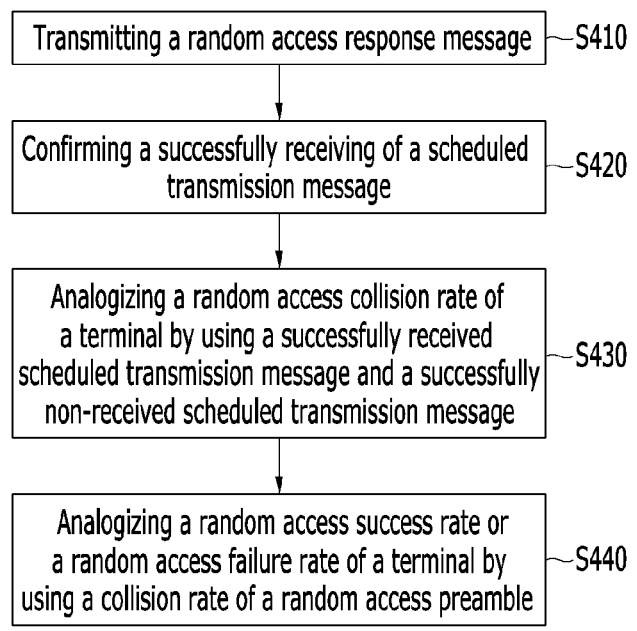

FIG. 4 is a view showing a method of inferring a random access failure rate of a terminal in a base station according to a second exemplary embodiment of the present invention.

Referring to FIG. 4, the base station 200 may infer the random access success rate or the random access failure rate through the scheduled transmission message transmitted by the terminal.

When the plurality of terminals transmit the scheduled transmission messages different from each other to the same resource, a situation that the base station 200 does not receive the plurality of scheduled transmission messages may be generated. Here, a case that the base station 200 correctly receives one or some of the plurality of scheduled transmission messages, or correctly receives none of the plurality of scheduled transmission messages, may be generated.

Since the uplink resource is allocated for the transmission of the scheduled transmission message of the terminal that transmits the successfully detected random access preamble among the terminals transmitting the random access preamble, the base station 200 may determine the successful receiving of the corresponding scheduled transmission message.

After the random access response message is transmitted (S410), the base station 200 confirms that the scheduled transmission message is successfully received (S420). In the case that the base station 200 does not successfully receive the schedule transmission message, a case that the plurality of terminals simultaneously transmit the scheduled transmission message such that the collision is generated, a case that only one terminal transmits the scheduled transmission message to the corresponding uplink resource but the scheduled transmission message is not successfully received in the base station 200 due to a poor channel environment, or a case that the terminal does not successfully receive the random access response message from the base station 200 may be included. Also, when the plurality of scheduled transmission messages are transmitted by the plurality of terminals, the base station 200 may successfully receive at least one scheduled transmission message. In this case, the base station 200 may confirm that the plurality of terminals transmit the scheduled transmission message through the corresponding uplink resource and may confirm that the plurality of terminals transmit the same random access preamble to the same random access resource, and the collision is generated during the random access preamble transmission of the terminal. In this case, the base station 200 transmits the contention resolution message to the specific terminal among the plurality of terminals transmitting the scheduled transmission message to only allow the base station access of the specific terminal. Accordingly, the remaining terminal fails in the base station access (the successful random access failure).

Accordingly, the base station 200 may infer the random access collision probability of the terminal through the entire or partial combination of the entire resource allocated to receive the scheduled transmission message, the resource allocated for the successfully received scheduled transmission message, the number of successfully received scheduled transmission messages, the resource allocated for the successfully non-received scheduled transmission message, and the number of successfully non-received scheduled transmission messages (S430).

The base station 200 may infer the random access success rate or the random access failure rate of the terminal by using the collision probability of the random access preamble of the terminal (S440).

Figure 5:
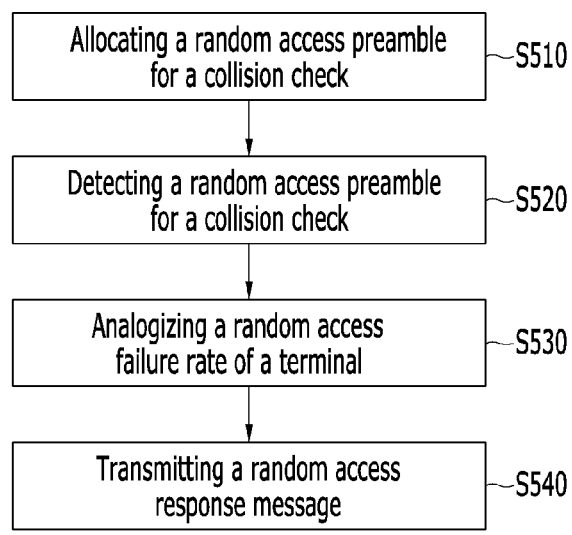

FIG. 5 is a view showing a method of inferring a random access failure rate of a terminal in a base station according to a third second exemplary embodiment of the present invention.

Referring to FIG. 5, the base station 200 allocates the specific random access preamble to confirm the random access collision existence, and the terminal that fails the random access transmits the specific random access preamble to provide the random access failure information of the terminal to the base station 200.

In the case that the terminal transmitting the random access preamble does not receive the random access response message, or in the case that the unique identifier or the TC-RNTI of the contention resolution message received by the terminal is different from the unique identifier or the TC-RNTI of the terminal, the terminal again performs the random access procedure. Here, the terminal may try the random access a maximum retransmission number of times that the random access may be performed, and the random access fails in the case of exceeding the maximum retransmission number. In this case, the terminal may confirm the collision existence of the random access preamble and selects and transmits one arbitrary collision check random access preamble among the collision check random access preamble specified in the base station, thereby informing that the terminal fails the random access to the base station 200. The collision check random access preamble represents the random access preamble specified to confirm the random access collision existence.

As shown in FIG. 5, the base station 200 allocates the collision check random access preamble (S510). The allocation information of the collision check random access preamble is broadcasted through the system information or may be previously set in the terminal.

Next, if the collision check random access preamble is detected (S520), the base station 200 may infer that the terminal fails the random access due to the random access collision and may infer the random access failure rate of the terminal (S530).

Next, as the random access response message is transmitted to the terminal (S540), the base station controls the terminal transmitting the random access preamble to continuously perform the random access procedure.

Figure 6:
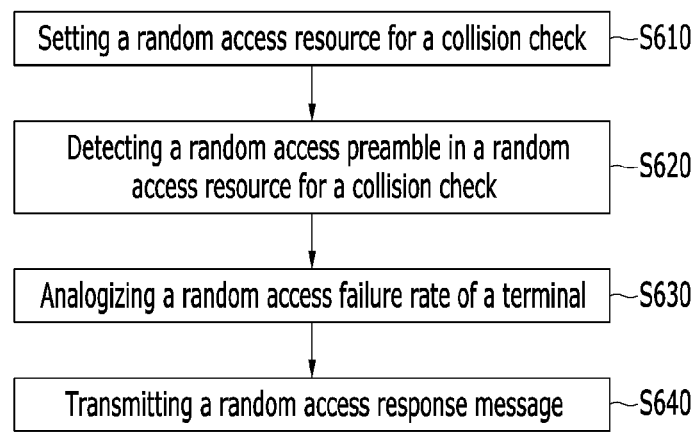

FIG. 6 is a view showing a method of inferring a random access failure rate of a terminal in a base station according to a fourth exemplary embodiment of the present invention.

Referring to FIG. 6, the base station 200 allocates the specific random access resource to confirm the random access collision existence, and the terminal that fails in the random access transmits the random access preamble through the specific random access resource, thereby providing the random access failure information of the terminal to the base station 200.

The terminal may try the random access by the maximum retransmission number that the random access may be performed, and fails the random access in the case of exceeding the maximum retransmission number. The terminal failing the random access transmits the random access preamble through the collision check random access resource specified in the base station. The collision check random access resource represents the random access resource specified to confirm the random access collision existence.

As shown in FIG. 6, base station 200 sets the collision check random access resource that may transmit the random access preamble when the terminal fails the random access as an idle resource (S610), and allocates the random access resource for the set collision check. The collision check random access resource information is broadcasted through the system information or may be previously set inside the terminal. The terminal that fails the random access selects the predetermined random access resource when the random access fails to transmit the random access preamble.

Next, if the random access preamble is detected in the predetermined collision check random access resource (S620), the base station 200 may infer that the terminal fails the random access, thereby inferring the random access failure rate (S630).

Next, as the random access response message is transmitted to the terminal (S640), the base station 200 controls the terminal transmitting the random access preamble to continuously perform the random access procedure.

Figure 7:
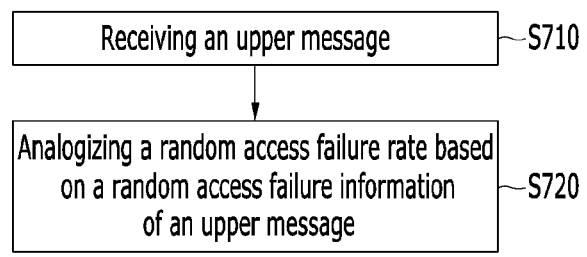

FIG. 7 is a view showing a method of inferring a random access failure rate of a terminal in a base station according to a fifth exemplary embodiment of the present invention.

Referring to FIG. 7, the terminal that fails the random access stores the random access failure information in the terminal, and if the corresponding terminal accesses the base station 200 through a successful random access, the random access failure information stored by itself is transmitted to the base station 200 through the upper message [for example, the terminal information response message (UEInformationResponse) of the RRC message].

The base station 200 receives the upper message from the accessed terminal (S710).

The base station 200 may infer the random access success rate or the random access failure rate that is applied on average of the terminal based on the random access failure information of the upper message received from the access terminal (S720).

In this way, when transmitting the random access failure information by using the upper message, the situation that the terminal finally accesses the base station (the successful situation of the random access) is with a basic premise, and in this case, compared with the method of FIG. 3 to FIG. 6, it difficult to dynamically provide the random access success rate or the random access failure rate from the terminal.

Also, the base station 200 may infer the random access success rate or the random access failure rate of the terminal by one among the methods corresponding to the above-described first to fifth exemplary embodiments, a combination of two or more methods, or a partial variation.

Figure 8:
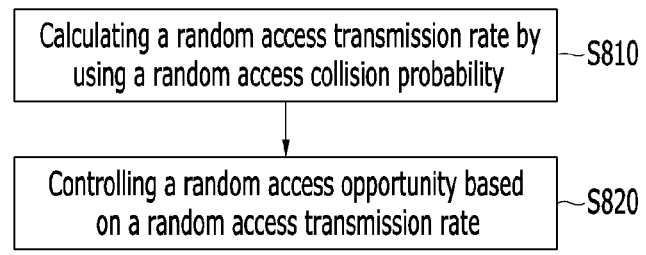
FIG. 8 is a view showing a detailed method for controlling a random access opportunity in a base station according to an exemplary embodiment of the present invention.

FIG. 8 is a view showing a method of controlling a random access opportunity in a base station according to an exemplary embodiment of the present invention in detail.

Referring to FIG. 8, the base station 200 may infer a distribution of how many terminals perform the random access in a unit random access opportunity by utilizing the random access collision probability of each terminal. Here, the number of terminals performing the random access per unit random access opportunity represents how many terminals perform the random access by considering one resource and one random access preamble that can perform the random access, and in an exemplary embodiment of the present invention, the number of terminals performing the random access per unit random access opportunity is represented as a random access transmission rate.

The random access transmission rate is increased in the situation that the plurality of terminals perform the random access, and the random access transmission rate is decreased in the situation that a relatively small number of terminals perform the random access. Likewise, when the number of terminals performing the random access is constant, if the base station 200 increases the random access opportunity, the random access transmission rate is decreased, while if the base station 200 decreases the random access opportunity, the random access transmission rate is increased. That is, in the situation that the random access transmission rate is high, the collision probability is increased in the random access preamble transmitted by the terminal or the scheduled transmission message, and thereby the random access congestion situation is generated.

The base station 200 calculates the random access transmission rate by using the inferred random access collision probability (S810). The random access transmission rate may be calculated by Equation 1.

$$\lambda = -N \cdot \frac{(1-p)\ln(1-p)}{1-p^{M+1}}$$ (Equation 1)

$$\lambda = -N \cdot \frac{(1-p)\ln(1-p)}{1-p^{M+1}}$$

Here, $\lambda$ represents the random access transmission rate, and N represents a random access opportunity amount (a total opportunity amount including a number of random access possible resources and a number of random access preambles). Also, p represents the random access collision probability inferred by the base station 200, and M represents a maximum retransmission number that the terminal can retransmit the random access preamble.

The base station 200 controls the random access opportunity to decrease the random access collision probability based on the calculated random access transmission rate (S820). Since the random access transmission rate may be dynamically changed according to the terminal performing the random access, the base station 200 may periodically control the random access opportunity according to the change of the random access transmission rate or according to a size of the change.

An optimization problem to control the random access opportunity may be possible to access various methods, and a target function thereof may use a minimization of the random access collision probability and a minimization of the collision probability for the random access opportunity. Also, limitations (considerations) to solve the optimization problem may include a combination or a part of a total number of the random access opportunities, a delay of the random access average, and a complexity in the base station.

For example, if the random access collision probability is represented by the random access transmission rate and the random access opportunity amount, it may be approximately represented by a Lambert W function like Equation 2 to Equation 4, and a difference of the equations is generated according to the approximation method, however a similar form to Equation 2 to Equation 4 may be generally provided.

$$p_{app} \approx -W\left(-\frac{\lambda}{N}\right)$$ (Equation 2)

$$p_{app} \approx 1 - \frac{\ln\left(1-\frac{\lambda}{N}\right)}{W\left(\ln\left(1-\frac{\lambda}{N}\right)\right)}$$ (Equation 3)

$$p_{app} \approx 1 - \exp\left(W\left(-\frac{\lambda}{N}\right)\right)$$ (Equation 4)

In Equation 2 to Equation 4, $p_{app}$ represents the random access collision probability.

Accordingly, the base station 200 may control the random access opportunity by optimizing the target function considering the random access collision probability or the random access collision probability.

Next, a method of transmitting the random access opportunity information controlled by the base station 200 will be described in detail.

Figure 9:
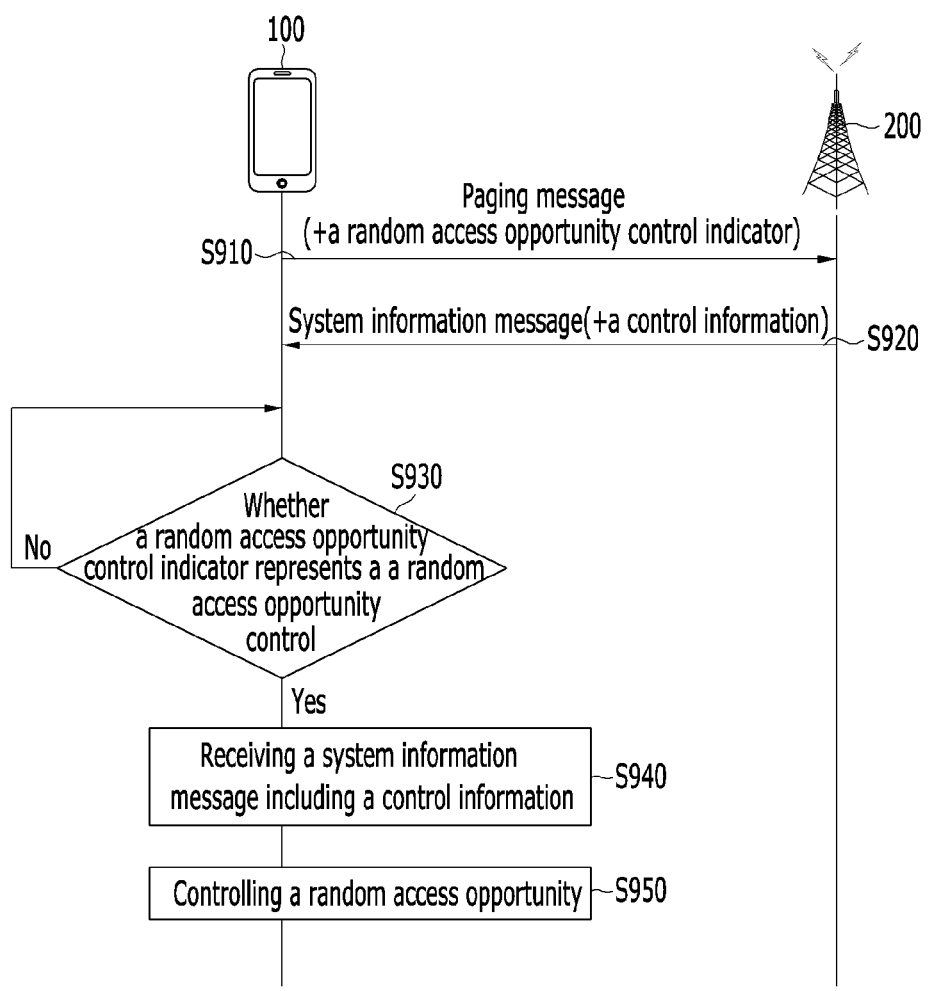
FIG. 9 to FIG. 13 are views showing an example of a method for transmitting random access opportunity information controlled in a base station according to first to fifth exemplary embodiments of the present invention.

FIG. 9 is a view showing a method of transmitting random access opportunity information controlled in a base station according to a first exemplary embodiment of the present invention.

Referring to FIG. 9, the base station 200 includes a random access opportunity control indicator representing a random access opportunity control existence in a paging message, and transmits the paging message including the random access opportunity control indicator to the terminal 100 (S910), thereby informing control of the random access opportunity to the terminal 100. For example, when the random access opportunity is controlled, the base station 200 may set the random access opportunity control indicator to 1, ad when the random access opportunity is not controlled, the random access opportunity control indicator may be set to 0.

Also, when the random access opportunity is controlled through the random access opportunity control indicator of the paging message, the base station 200 transmits the control information for how the random access opportunity is controlled to the terminal 100 through the system information message (S920). The control information may include at least one among a route index to generate the random access preamble, a number of the usable random access preamble, a cyclic shift value to generate the random access preamble, a position of the random access resource, and the random access configuration information.

If the paging message is received, the terminal 100 confirms whether the random access opportunity control indicator exists in the paging message (S930).

When the random access opportunity control indicator represents that the random access opportunity is controlled, the terminal 100 receives the system information message including the control information (S940).

The terminal 100 controls the random access opportunity according to the control information (S950). For example, when the random access opportunity control indicator is 1, the terminal 100 may generate an additional random access preamble by applying a ZC (Zadoff-Chu)-sequence route index and the cyclic shift value to generate the random access preamble that is currently used according to the control information, and the terminal 100 may increase the number of random access preambles that are selectable during the random access.

Alternatively, the base station 200 may provide the random access opportunity control existence and the control information by using the random access opportunity control indicator. For example, it is assumed that the base station 200 may control the number of random access preambles to 64 or 128. In this case, when the number of random access preambles is controlled to be 128, the base station 200 may set the random access opportunity control indicator to 1, and when the number of random access preambles is controlled to be 64, the random access opportunity control indicator may be set to 0.

Figure 10:
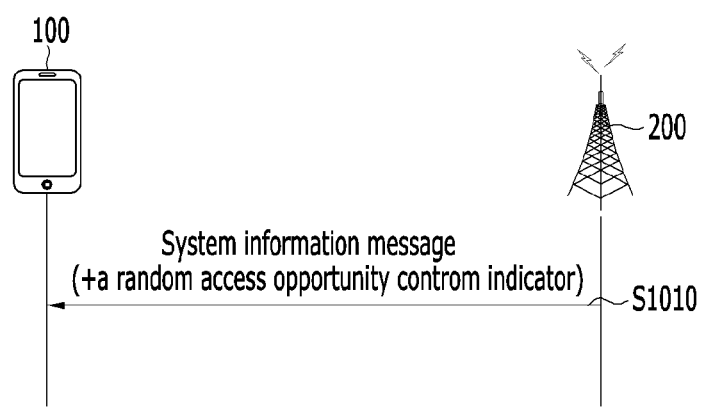

FIG. 10 is a view showing a method of transmitting random access opportunity information controlled in a base station according to a second exemplary embodiment of the present invention.

Referring to FIG. 10, the base station 200 may provide the random access opportunity control indicator through the system information message. As the system information message including the random access opportunity control indicator is transmitted (S1010), the base station 200 may inform the terminal 100 that the random access opportunity is controlled. The system information message may be periodically transmitted or may be transmitted in a case of a change of the detail information in the system information message. The base station 200 may transmit the random access opportunity control indicator by using a system information block 2 (SIB2) including conventional random access relevant information or a separate SIB.

When including the random access opportunity control indicator in the system information message, the base station 200 may provide the information that part of the system information message is changed to the terminal 100 through the paging message or the change existence of the system information message through an additional indicator in the paging message.

In detail, the base station 200 adds a bit indicator representing the random access opportunity control indicator and/or the control information to the system information message (e.g., SIB2 of LTE/LTE-A) providing random access relevant information. Here, a size of the bit indicator may be adjusted according to a degree of increasing or decreasing the random access opportunity. That is, the bit indicator is subdivided according to the degree of the increasing or the decreasing of the random access opportunity, thereby being provided as various values.

Also, the base station 200 transmits the system information message including the random access opportunity control indicator and/or the bit indicator.

When the number of random access preambles controllable by the base station 200 is 32, 64, 128, and 256, the base station 200 may select and transmit one among the bit indicator of 2 bits in which {32, 64, 128, 256} information is mapped to the system information message. The terminal 100 may control the number of random access preambles based on the 2 bit bit indicator.

Also, the base station 200 may control the number of random access preambles through the bit indicator of 1 bit. For example, it is assumed that the number of random access preambles controllable by the base station 200 is 64 or 128. When the number of random access preambles is increased, the base station 200 may set the bit indicator to 1, and when the number of random access preambles is maintained, the bit indicator may be set to 0. In this case, when the number of random access preambles is maintained as it is, the bit indicator may not be included in the system information message.

The random access opportunity may be configured by the combination of the several elements such as the number of random access preambles or random access resources. Accordingly, the base station 200 may provide the control information to the terminal 100 by mapping the control information to the bit indicator determined according to each element, or may provide the control information to the terminal 100 by using the bit indicator made of the appropriate combination of each element. For example, when the number of random access preambles usable by the base station 200 is {64, 128} and an extra random access resource may be used in the frequency domain other than the random access resource used as a default, the base station 200 may provide the control information to the terminal 100 by using 1 bit corresponding to the random access preamble and 1 bit corresponding to the random access resource. In detail, the base station 200 may represent the number of random access preambles used by the first resource through the bit indicator of 00 and 01 by combining the bit representing the first resource among the random access resources and the bit representing the number of random access preambles used in the corresponding resource. Similarly, the base station 200 may represent the number of random access preambles used by the second resource through the bit indicator of 10 and 11 by combining the bit representing the second resource among the random access resources and the bit representing the number of the random access preambles used in the corresponding resource. Here, the first and second are for the resource distinction, but do not represent the rank of a priority of the random access resource.

Also, the base station 200 may provide each random access resource and the number of random access preambles used in the corresponding resource to the terminal 100 by using the bit indicator of the total of 2 bits. For example, when 64 random access preambles are used in the random access resource used as the default, and 128 random access preambles are used in the random access resource that is additional increased, the base station 200 may represent the number of random access preambles used in the random access resource used as the default through the bit indicator of 00 and 01, and may represent the number of random access preambles used in the random access resource that is additionally increased through the bit indicator of 10 and 11. That is, the base station 200 may inform the use of the 64 random access preambles in the random access resource that is additional increased to the terminal through the bit indicator of "10".

The base station 200 may provide the control information by using one among the above-described methods, and the detailed value (for example, the control method or the mapping information according thereto, etc.) to provide the control information to each method may be shared between the terminal 100 and the base station 200 through the system information message or the pre-configured information.

Figure 11:
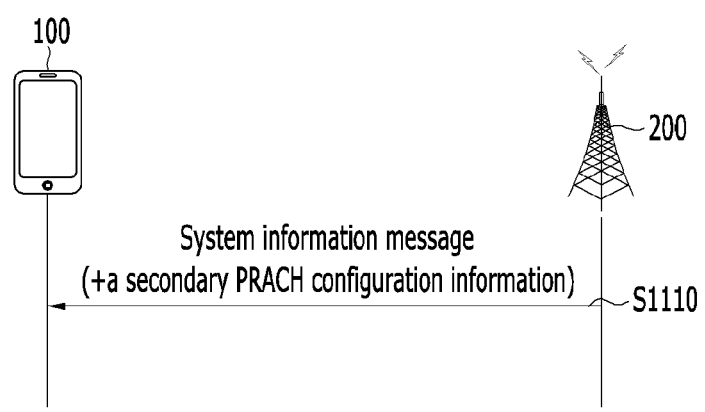

FIG. 11 is a view showing a method of transmitting random access opportunity information controlled in a base station according to a third exemplary embodiment of the present invention.

Referring to FIG. 11, secondary PRACH configuration information is used to provide the information for the random access opportunity controlled by the base station 200 to the terminal 100. The secondary PRACH configuration information means configuration information of the same type as default PRACH configuration information used as the default.

As the system information message including the secondary PRACH configuration information (S1110), the base station 200 may inform the terminal 100 of the controlled random access opportunity information.

The terminal 100 may perform the random access by using the random access opportunity according to the secondary PRACH configuration information included in the system information message. The usage of the random access opportunity according to the secondary PRACH configuration information in the terminal 100 may be provided through a separate indicator information, and if the system information message including the secondary PRACH configuration information is received from the base station 200, the terminal 100 may use the random access opportunity according to the secondary PRACH configuration information.

The secondary PRACH configuration information may include at least part among the information such as the route index to generate the random access preamble, the number of usable random access preambles, the circle shift value to generate the random access preamble, the position of the random access resource, and the random access configuration information. Also, other information related to the random access opportunity may be included in the secondary PRACH information.

For example, when the base station 200 additionally increases the random access resource to increase the random access opportunity, the random access resource may be newly configured in the adjacent band besides the band in which the conventionally used random access resource is configured. In this case, the base station 200 may newly provide the random access preamble information related to the position of the predetermined random access resource, the route index to generate the random access preamble, the cycle shift value, the number of usable random access preambles, and other configuration information through the secondary PRACH configuration information to the terminal 100.

The base station 200 provides the information for at least one random access opportunity through at least one secondary PRACH configuration information set.

The base station 200 may add the secondary PRACH configuration information to the default PRACH configuration information for the random access opportunity that is conventionally used in the system information message. For example, when increasing the number of random access preambles of the PRACH used as the default, the base station 200 may add the information of the number of random access preambles to be increased to the default PRACH configuration information. Alternatively, the base station 200 may add the separate secondary PRACH configuration information to the system information message besides the default PRACH configuration information.

Also, the base station 200 may provide the information on whether using any secondary PRACH configuration or any secondary PRACH configuration of two or more secondary PRACH configurations to the terminal 100 through the separate indicator when controlling the random access opportunity.

Figure 12:
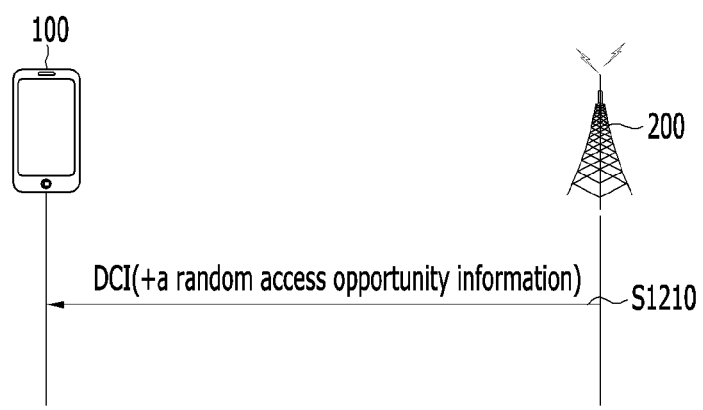

FIG. 12 is a view showing a method of transmitting random access opportunity information controlled in a base station according to a fourth exemplary embodiment of the present invention.

Referring to FIG. 12, downlink control information (DCI) includes information required for receiving downlink data from the base station 200 through the terminal 100, for example, information such as whether the downlink data transmitted by the base station 200 is transmitted to any resource by any method. Also, the DCI may further include information for a message to support the random access or to improve the random access performance.

The base station 200 may transmit the random access response message and the contention resolution message to the terminal 100 in the random access procedure. In this case, the information to receive the random access response message or the contention resolution message is transmitted to the terminal 100 through the DCI. Accordingly, the terminal 100 transmitting the random access preamble during the random access procedure receives the DCI to receive the random access response message transmitted by the base station 200, and the terminal 100 transmitting the scheduled transmission message receives the DCI to receive the contention resolution message transmitted by the base station 200.

The base station 200 uses the DCI to transmit the controlled random access opportunity information. The base station 200 includes the random access opportunity control indicator and the secondary PRACH configuration information in the DCI, and transmits the DCI including the random access opportunity information to the terminal 100 (S1210).

The terminal 100 may control the random access opportunity according to the random access opportunity information received through the DCI. When the bit indicator representing the random access opportunity control indicator and/or the control information is received, the terminal 100 may control the random access opportunity according to a predetermined value or the mapping information received through the system information message of the base station 200.

For example, it is assumed that the base station 200 may control the number of random access preambles to 64 or 128. In this case, the base station 200 may transmit the DCI setting of the random access opportunity control indicator set to 1 when it is attempted to control the number of random access preambles to 128, and transmit the random access opportunity control indicator set to 0 when it is attempted to control the number of random access preambles to 64. In this case, the terminal 100 receiving the DCI including the random access opportunity control indicator of 1 or 0 receives the downlink data transmitted by the base station 200 based on the received DCI. The terminal 100 may determine that the received result downlink data (for example, the random access response message or the contention resolution message) is not its own data, that the retransmission number of random access preambles is larger than the maximum retransmission number, or to change the random access opportunity. The random access opportunity control indicator is set to other values that are not the default value in the DCI, and the terminal 100 may control the random access opportunity according to the value of the predetermined random access opportunity control indicator. The terminal 100 performs the random access based on the random access opportunity controlled when performing the random access preamble retransmission or the new random access.

The base station 200 may set a separately predetermined RNTI (radio network temporary identifier) to provide the secondary PRACH configuration information. The RNTI uses the value that is commonly provided to the base station 200 and the terminal 100 through the system information message or a pre-configuration. The terminal 100 performing the random access confirms the DCI through the RA-RNTI or the TC-RNTI to receive the random access response message or the contention resolution message from the base station 200. In this case, the terminal 100 may receive the secondary PRACH configuration information by performing blind decoding by using a separately predetermined RNTI together therewith.

Also, when random access preambles of more than the maximum retransmission number are retransmitted or the random access fails, the terminal 100 performing the random access may confirm the DCI by using the separate RNTI to be provided with the secondary PRACH configuration information.

The DCI provided for the secondary PRACH configuration information by the base station 200 may include at least part of the secondary PRACH configuration information. Also, the DCI provided for the secondary PRACH configuration information by the base station 200 may also include a position of the downlink data and transmission type information providing the secondary PRACH configuration information. In this case, the actual secondary PRACH configuration information may be partially or entirely included in a MAC message generated by a MAC (medium access control) layer. For example, the MAC message may be the random access response message.

The base station 200 may use a format of the DCI by recycling a conventional DCI (downlink control information) format or a new format. For example, when recycling the conventional DCI format to provide the secondary PRACH configuration information, the base station 200 may set the corresponding DCI format and the entire bit size to be equal, and each field configuration and each field bit size to be different. In each field, the secondary PRACH configuration information may be included.

Table 1 represents a case that the base station 200 uses a DCI format 0 to provide the secondary PRACH configuration information. The base station 200 may recycle the DCI format 0 to provide the secondary PRACH configuration information like in Table 1.

TABLE 1

| Field name | bits (for 20 MHz) |
|---|---|
| PRACH opportunity expansion flag | 1 |
| Resource index for a secondary PRACH | 4 |
| Route index | 10 |
| Number of random access preambles | 2 |
| Recycle shift | 4 |
| PRACH configuration | 6 |
| Preliminary field for future use | 1 |
| Total | 28 |

The DCI format 1A or 1C may be used for the secondary PRACH configuration information in addition to the DCI format 0, and the detailed field may also be adjusted like in Table 1.

The terminal 100 receives the DCI by using its own RNTI. Here, the RA-RNTI is required for confirming the random access response message DCI. The RA-RNTI is generated based on the position of the random access resource transmitting the random access preamble through the terminal 100 and the random access preamble selected by the terminal 100. Also, the terminal 100 uses the TC-RNTI to confirm the DCI of the contention resolution message.

The base station 200 may use a separate message for the random access opportunity control or the terminal that fails the random access instead of the random access response message or the contention resolution message, and in this case, a separate RNTI may be set to be used instead of the conventional RA-RNTI or TC-RNTI used in the random access. Here, the separate RNTI may be selected in the RNTI that is usable by the terminal 100 to be set as the default and may be broadcasted through a system information message by the base station 200.

The base station 200 may include the random access opportunity information in the DCI using the separate RNTI or the downlink data representing the corresponding DCI to be transmitted. The terminal 100 attempting the random access performs the blind decoding in a Physical Downlink Control Channel (PDCCH) by using the RA-RNTI to receive the random access response message from the base station 200 and the TC-RNTI to receive the contention resolution message. In this case, the terminal 100 attempting the random access may together perform the blind decoding by using the separate RNTI to receive the random access opportunity information, and may receive the random access opportunity information from the DCI successfully received through the separate RNTI or the downlink data represented by the DCI.

For example, the base station 200 transmits the random access opportunity control indicator through the DCI to receive the random access response message, and the terminal 100 confirms the DCI through the RA-RNTI or a RNTI predetermined separately to receive the random access opportunity control indicator information. The terminal 100 receiving the random access opportunity control indicator through the DCI confirms whether the random access opportunity control indicator received through the DCI accords with the random access opportunity control indicator applied while performing its own random access. If the two indicators are different, the terminal 100 may retransmit the random access preamble after controlling the random access opportunity control according to the value of the random access opportunity control indicator during the random access. Also, the terminal 100 may again perform the random access after controlling the random access opportunity according to the value of the random access opportunity control indicator in the random access preamble retransmission by the random access after storing the random access opportunity control indicator information.

As another example, when the base station 200 transmits the random access opportunity control indicator through the DCI to receive the contention resolution message, the terminal 100 confirms the DCI through a separately predetermined RNTI to receive the TC-RNTI or the random access opportunity control indicator information. In this case, when the unique identifier of the terminal among the terminals receiving the contention resolution message is different from the unique identifier of the terminal transmitted by the base station 200 through the contention resolution message, the terminal 100 does not confirm RRC connection information, but again performs the random access. Accordingly, the terminal 100 stores the random access opportunity control indicator information in the DCI when it is determined that the received contention resolution message is not the message transmitted to it in the random access preamble retransmission, and the random access may be again performed after controlling the random access opportunity according to the value of the random access opportunity control indicator.

Likewise, when the base station 200 transmits the secondary PRACH configuration information through the DCI to receive the contention resolution message, the terminal 100 may confirm the DCI through the TC-RNTI or the separately predetermined RNTI. When the received contention resolution message is not the message transmitted to it, the terminal 100 stores the secondary PRACH configuration information, and the random access may be performed after controlling the random access opportunity based on the secondary PRACH configuration information in the random access preamble retransmission.

Figure 13:
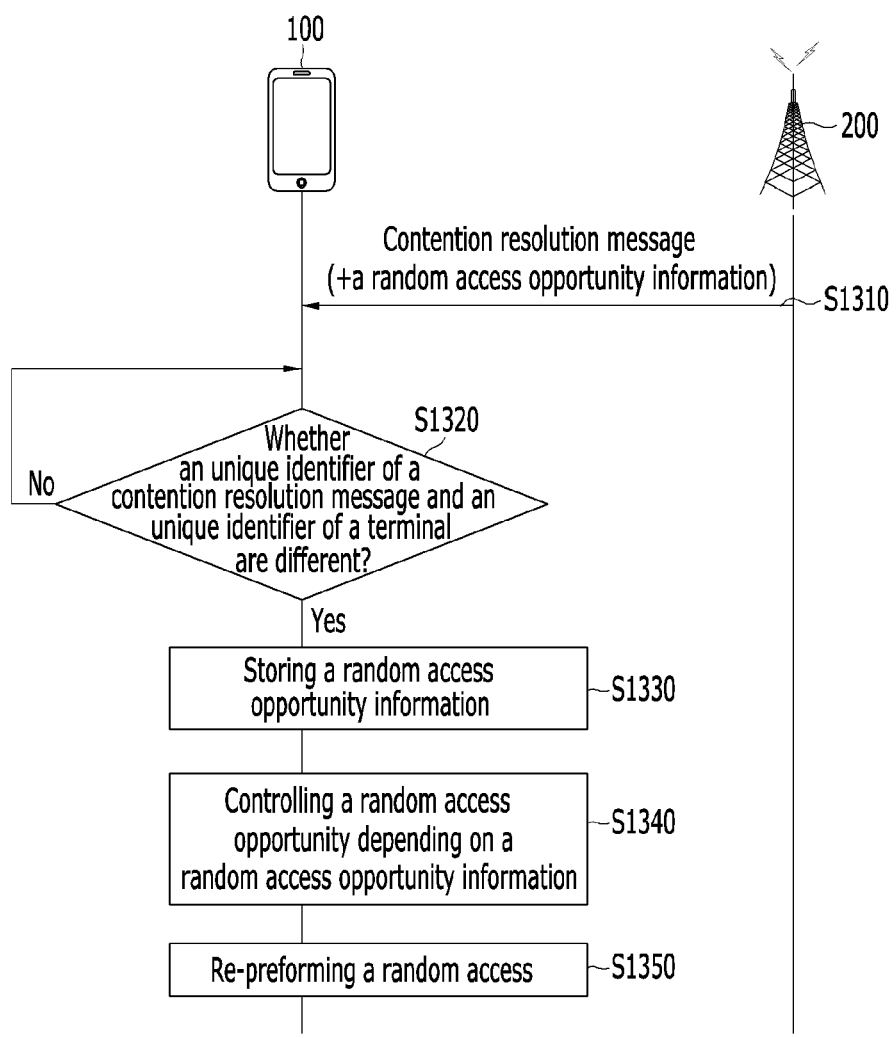

FIG. 13 is a view showing a method of transmitting random access opportunity information controlled in a base station according to a fifth exemplary embodiment of the present invention.

The base station 200 transmits the contention resolution message to the terminal 100 having transmitting the scheduled transmission message that is successfully received. The contention resolution message includes the information for the contention resolution information and the RRC connection configuration. The contention resolution information may include the unique identifier of the terminal having transmitting the scheduled transmission message that is successfully received in the base station 200 and the uplink resource allocation information.

As shown in FIG. 13, in an exemplary embodiment of the present invention, the base station 200 includes the random access opportunity information for the terminal 100 in the contention resolution message to be transmitted (S1310) such that the terminal 100 that normally performs the contention resolution message, but does not successfully perform the random access through the contention resolution, again performs the random access by using the controlled random access opportunity. Alternatively, the base station 200 may use the RRC connection configuration message to provide the random access opportunity information for the terminal 100. As described above, the random access opportunity information may include at least part among the random access opportunity control indicator information, the bit indicator representing the controlled information, and the secondary PRACH configuration information.

The terminal 100 successfully receives the contention resolution message, however if it is determined that the unique identifier of the contention resolution message received through a contention resolution mechanism is different its own unique identifier (S1320), the terminal 100 stores the random access opportunity information included in the received contention resolution message (S1330), and again performs the random access (S1350) after controlling the random access opportunity according to the random access opportunity information (S1340).

As one example, when transmitting the random access opportunity information through a MAC message of the contention resolution message, the base station 200 may add a MAC sub-header to the contention resolution message. Here, the MAC sub-header may use one value among 01011-11010 of a reserved LCID (logical channel ID), and the base station 200 may fixedly use one among the reserved LCIDs for the random access opportunity information. The LCID informs the information that a random access opportunity information is included in a MAC CE (control element) or a MAC SDU (service data unit) indicated by the corresponding MAC sub-header. When using the MAC CE, the base station 200 may set the CE of a fixed octet unit by considering a size of the random access opportunity information. When providing the random access opportunity by using the MAC SDU without the MAC CE or providing the random access opportunity by using the MAC CE of the variable size, the base station 200 may add a field providing information for the size of the MAC SDU or the MAC CE providing the random access opportunity information to the MAC sub-header.

On the other hand, when increasing the usable random access preamble for the random access or using the secondary PRACH configuration for the random access in the base station 200 and the terminal 100, the changed random access opportunity (the preamble or the resource) that is not conventionally used is used in the random access procedure. Accordingly, a method for classifying the conventional random access opportunity and secondary PRACH configuration that are used as the default or the random access opportunity changed according to the random access opportunity control is required.

Figure 14:
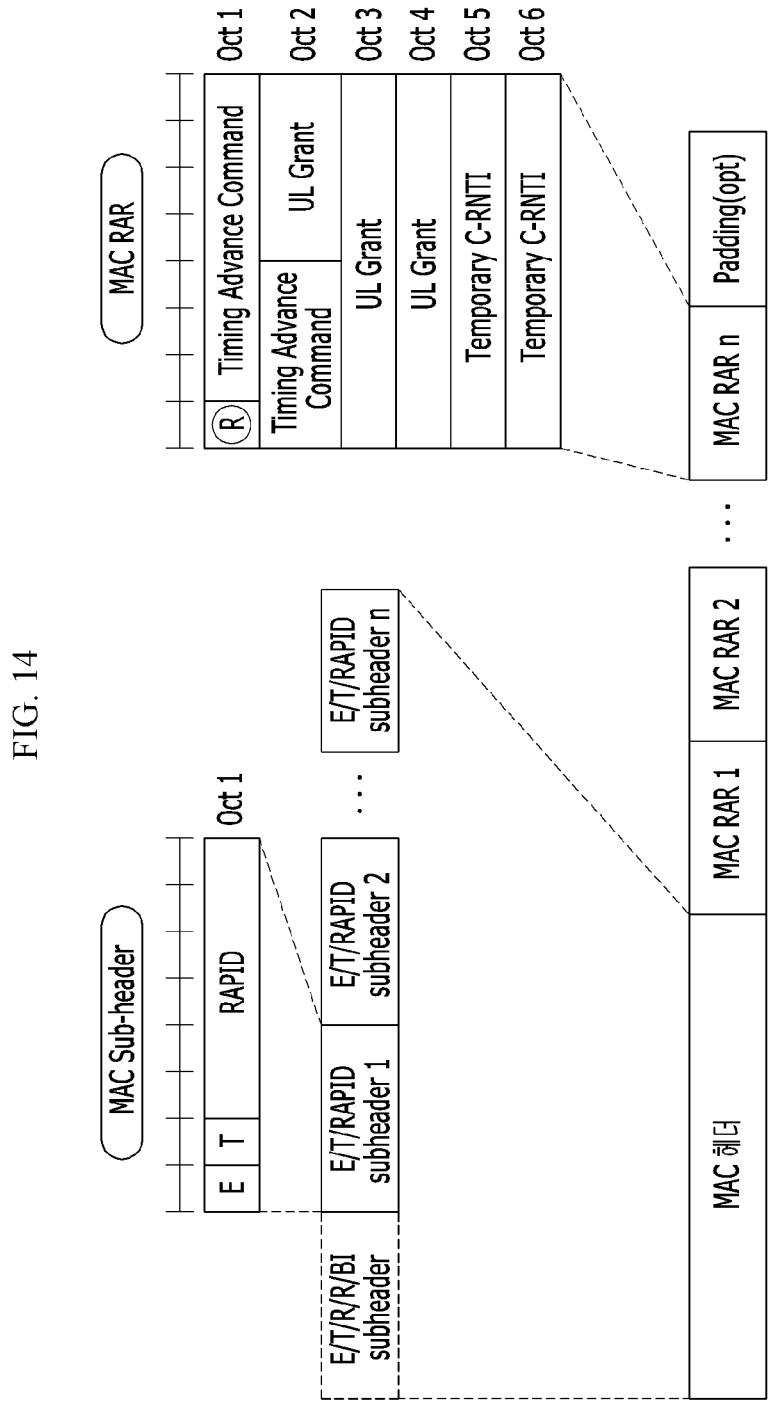
FIG. 14 and FIG. 15 are views explaining a method for classifying a random access opportunity changed through a random access response message according to an exemplary embodiment of the present invention.
Figure 15:

FIG. 14 and FIG. 15 are views explaining a method for classifying a random access opportunity that is changed through a random access response message according to an exemplary embodiment of the present invention.

Referring to FIG. 14, the random access response message is composed of a format of the MAC message for the random access response. The random access response MAC message may be composed of the MAC header, at least one MAC RAR (random access response), and padding, and the padding may be omitted. The MAC header may be composed of at least one MAC sub-header, and each MAC sub-header may correspond to each MAC RAR (random access response) and supports the corresponded MAC RAR. Each MAC RAR includes a TC-RNTI, a TA command, and uplink resource allocation information (UL Grant).

Like this, the MAC sub-header of the random access response message serves to provide information about whether the MAC RAR indicated by the MAC sub-header through the random access preamble index is for the terminal transmitting through any random access preamble.

The base station 200 and the terminal 100 have the information of the increased random access preamble or the secondary PRACH configuration information. However, the base station 200 may classify whether the detected random access preamble is the preamble having any index and is transmitted from any random access resource (for example, any resource of the conventional PRACH and the secondary PRACH) to provide the information for the detected random access preamble to the terminal.

The MAC sub-header of the random access response MAC message has a total of 8 bits, and the random access preamble index (PRAID) field of the MAC sub-header has the size of 6 bits and displays the random access preamble index. The remaining 2 bits of the MAC sub-header represent whether there is an additional sub-header in the MAC sub-header, or the sub-header transmits the random access preamble index.

The terminal 100 searches the MAC sub-header having the same index as the random access preamble index transmitted by itself in the MAC sub-header of the received MAC message, and receives the information of the MAC RAR field indicated by the searched MAC sub-header. However, when it is insufficient to express the entire random access opportunity by 6 bits (except for a case that the random access opportunity is classified through the RA-RNTI), the base station 200 may classify the random access opportunity by using a below-described method to be provided to the terminal 100, and the conventional random access opportunity and the changed random access opportunity may be classified through the combination of the below-described method or a partial variation.

The base station 200 may classify the random access opportunity by partially varying the random access response MAC message. Various methods may be used as well as the method of partially varying the random access response MAC message.

The base station 200 may classify the random access opportunity by changing the MAC RAR of the random access response MAC message. The MAC RAR indicating each MAC sub-header includes configuration information for the terminal receiving the corresponding random access response message, and for example, includes the TC-RNTI of the terminal allocated by the base station 200, the uplink resource allocation information, and a TA value to meet the uplink timing. In this case, the base station 200 may use the reserved bit of the MAC RAR as a random access opportunity divider to classify the random access opportunity. For example, the base station 200 using the 64 random access preambles for the random access increases the number of random access preambles to 128 through the random access opportunity control, and the base station 200 sets the 64 random access preambles that are conventionally used as a group 1 and the added 64 random access preambles as a group 2. Here, the group is divided for convenience of description, however the group may be actually set to be used for easy management in the base station depending on a purpose, type, etc. of the terminal. Each random access preamble group divided into the group 1 and the group 2 may be represented by the conventional 6 bit random access preamble index. Accordingly, the 1 bit is required to classify the group 1 and the group 2, and the base station 200, as shown in FIG. 14, may use the reserved bit (R) of the MAC RAR as the 1 bit random access opportunity divider. The base station 200 may use the reserved 1 bit of the MAC RAR to classify the conventional 64 random access preambles and the added 64 random access preambles. For example, the base station 200 may set the random access preamble index of the MAC sub-header as 32 and the random access opportunity divider of the MAC RAR as 1 to represent the 32nd random access preamble among the added 64 random access preambles. Also, when the base station 200 using the 64 random access preambles for the random access sets the secondary PRACH through the random access opportunity, the base station 200 may set the random access opportunity divider as 0 to indicate the conventionally used PRACH and the random access opportunity divider as 1 to indicate the newly predetermined secondary PRACH. That is, the base station 200 represents the random access preamble index used in each PRACH as 6 bits of the MAC sub-header, and may use the random access opportunity divider to classify the PRACH.

The base station 200 may classify the random access opportunity by changing the MAC sub-header of the random access response MAC message. The base station 200 may expand the size of the MAC sub-header of the random access response MAC message from 8 bits to 16 bits to be used. The base station 200 may add the random access opportunity identifier to identify the changed random access opportunity by using the expanded MAC sub-header. Here, the random access opportunity identifier is the identifier identifying whether the terminal is transmitted to any random access preamble in any resource. The size of the MAC sub-header to classify the changed random access opportunity may be fixed by considering the total size of the controllable random access opportunity, or may represent the bit size used to provide the information for the random access opportunity through part of the bits among the MAC sub-header. Also, the bit of the MAC sub-header may be used for whether the additional MAC sub-header exists in the MAC header, and the MAC sub-header is used to identify the random access opportunity and to provide the additional information for the random access opportunity control.

Also, the base station 200 may classify the random access opportunity by changing the position of the MAC sub-header and the MAC RAR representing the corresponding MAC sub-header. The base station 200 may continuously transmit, as shown in FIG. 15, the MAC sub-header and the MAC RAR representing the MAC sub-header without configuring the random access response MAC message in a form of the MAC header including at least one MAC sub-header and a MAC payload including at least one MAC RAR. The MAC header of the changed random access response MAC message represents the information such as the number of MAC sub-headers transmitted in the corresponding MAC message, and one MAC sub-header and one MAC RAR may set the size thereof by an octet unit. Each MAC sub-header may classify the random access opportunity by using a 6 bit or more random access opportunity identifier.

The base station 200 may classify the random access opportunity through the DCI for the random access response message, and the conventional random access opportunity and the changed random access opportunity may be classified through the combination of the below-described method or the partial variation. The base station 200 may add a random access opportunity divider field or a random access opportunity identifier field to the DCI. The base station 200 may add the random access opportunity divider field to the DCI to classify the random access opportunity. Accordingly, the base station 200 appropriate uses the random access opportunity divider field included in the DCI and the MAC sub-header of the random access response MAC message corresponding to DCI for the terminal receiving the random access response message to classify the random access preamble transmitted by itself and the random access opportunity corresponding to the random access resource. Here, the DCI uses the conventional format, the detailed field value may be adjusted to be used, or a new type of format for the random access response message may be used.

The base station 200 may classify whether any information is added to the DCI for the random access response message, and accordingly whether any information is included in the MAC sub-header, by a following method to classify the random access opportunity by the terminal, and the combined method thereof or the partially varied method may be used.

The base station 200 may include the random access opportunity divider in the DCI for the random access response message by using the group information to be transmitted. The terminal may use the group information provided from the DCI along with the random access preamble index information of the MAC sub-header to classify the random access opportunity. The size of the group information may be a pre-fixed value by considering the size of the random access opportunity that may be increased.

Alternatively, the base station 200 may include the random access preamble index information in the DCI for the random access response message to be transmitted, and may include the group information related to the random access opportunity and other additional information in the MAC sub-header to be transmitted. In this case, the terminal may use the random access preamble index information provided from the DCI and the random access group information provided from the MAC sub-header to classify the random access opportunity.

Also, the base station 200 may include the random access opportunity identifier in the DCI for the random access response message to be transmitted, and may include the information related to the random access opportunity or other additional information in the MAC sub-header to be transmitted. The terminal receiving the DCI may classify the random access opportunity through the random access opportunity identifier of the DCI for the random access response message.

For example, when the base station 200 using the 64 random access preambles for the random access increases the random access preambles by 64 without setting the secondary PRACH, the conventionally-used 64 random access preambles may be set as the group index 1, and the added 64 random access preambles may be set as the group index 2. Also, when the base station 200 increases the random access preambles by 64 and sets the secondary PRACH, the 64 random access preambles of the conventional random access resource is set as the group index 0, the added 64 random access preambles in the conventional random access resource are set as the group index 1, the 64 random access preambles of the secondary random access resource are set as the group index 2, and the added 64 random access preambles in the secondary random access resource are set as the group index 3, thereby being classified into a total of four groups.

Figure 16:
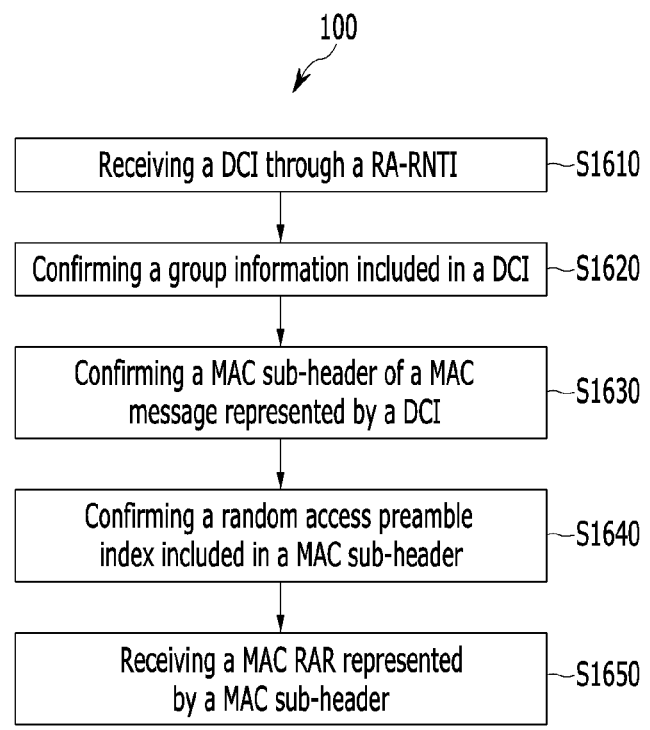
FIG. 16 is a flowchart showing an example of a method for classifying a random access opportunity in a terminal according to an exemplary embodiment of the present invention.

FIG. 16 is a flowchart showing an example of a method for classifying a random access opportunity in a terminal according to an exemplary embodiment of the present invention.

Referring to FIG. 16, the base station 200 may include the random access opportunity divider in the DCI for the random access response message by using the group information, and may include the random access preamble index information in the MAC sub-header of the random access response MAC message.

The terminal 100 to transmit the random access preamble receives the DCI through its own RA-RNTI to receive the random access response message (S1610).

When the successful DCI receiving is possible, the terminal 100 confirms the group information included in the DCI (S1620). The terminal 100 compares the group information included in the DCI with the group information of the random access opportunity used by itself. When the two groups are the same, the terminal 100 confirms the MAC sub-header of the MAC message represented by the DCI (S1630).

The terminal 100 confirms whether the random access preamble index included in the MAC sub-header is the same as the random access preamble index transmitted by the terminal 100 (S1640).

When the random access preamble index included in the MAC sub-header is the same as the random access preamble index transmitted by the terminal 100, the terminal 100 may successfully receive the MAC RAR represented by the MAC sub-header (S1650).

Figure 17:
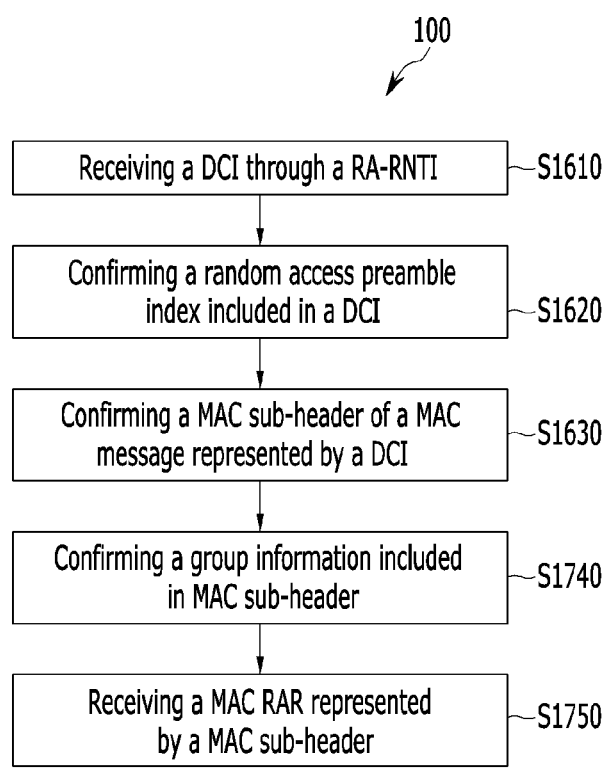
FIG. 17 is a flowchart showing another example of a method for classifying a random access opportunity in a terminal according to an exemplary embodiment of the present invention.

FIG. 17 is a flowchart showing another example of a method for classifying a random access opportunity in a terminal according to an exemplary embodiment of the present invention.

Referring to FIG. 17, to provide the information on whether any terminal must receive the MAC RAR of the random access response message, the base station 200 may include the random access preamble index transmitted by the terminal 100 in the random access preamble index field of the DCI to be transmitted. The DCI may include at least one random access preamble index according to the kind of the DCI format or the configuration of the inner field. Also, the base station 200 includes the group information classifying the random access opportunity, the information that may be added for the other random access opportunity, or other information in the MAC sub-header of the MAC message represented by the DCI to be transmitted.

The terminal 100 transmitting the random access preamble receives the DCI through its own RA-RNTI to receive the random access response message (S1710).

The terminal 100 receiving the DCI confirms whether the random access preamble index transmitted by itself accords with the random access preamble index of the random access preamble index field of the DCI (S1720). When the random access preamble index transmitted by itself and the random access preamble index of the random access preamble index field of the DCI are matched, the terminal 100 confirms the MAC sub-header of the MAC message represented by the DCI (S1730).

The terminal 100 confirms the group information included in the MAC sub-header (S1740). If it is matched with the group information of the random access preamble transmitted by the terminal 100, the terminal 100 may successfully receive the MAC RAR indicating the corresponding MAC sub-header (S1750).

Figure 18:
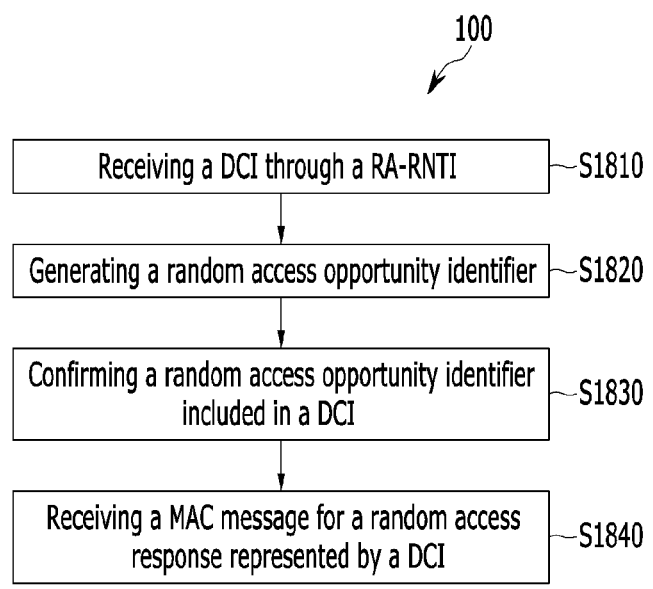
FIG. 18 is a flowchart showing another example of a method for classifying a random access opportunity in a terminal according to an exemplary embodiment of the present invention.

FIG. 18 is a flowchart showing another example of a method for classifying a random access opportunity in a terminal according to an exemplary embodiment of the present invention.

Referring to FIG. 18, the base station 200 includes the random access opportunity identifier in the DCI for the random access response message to be transmitted, and includes the additional information that may be provided in the random access opportunity or the random access procedure or other information in the MAC sub-header of the MAC message represented by the DCI to be transmitted, or may not use the MAC sub-header.

The terminal 100 transmitting the random access preamble receives the DCI through its own RA-RNTI to receive the random access response message (S1810).

The terminal 100 receiving the DCI generates the random access opportunity identifier based on the random access resource transmitting the random access preamble and the random access preamble index (S1820), and confirms the random access opportunity identifier included in the received DCI (S1830).

If the generated random access opportunity identifier and the random access opportunity identifier included in the DCI are matched, the terminal 100 receives the random access response MAC message represented by the DCI (S1840).

Figure 19:
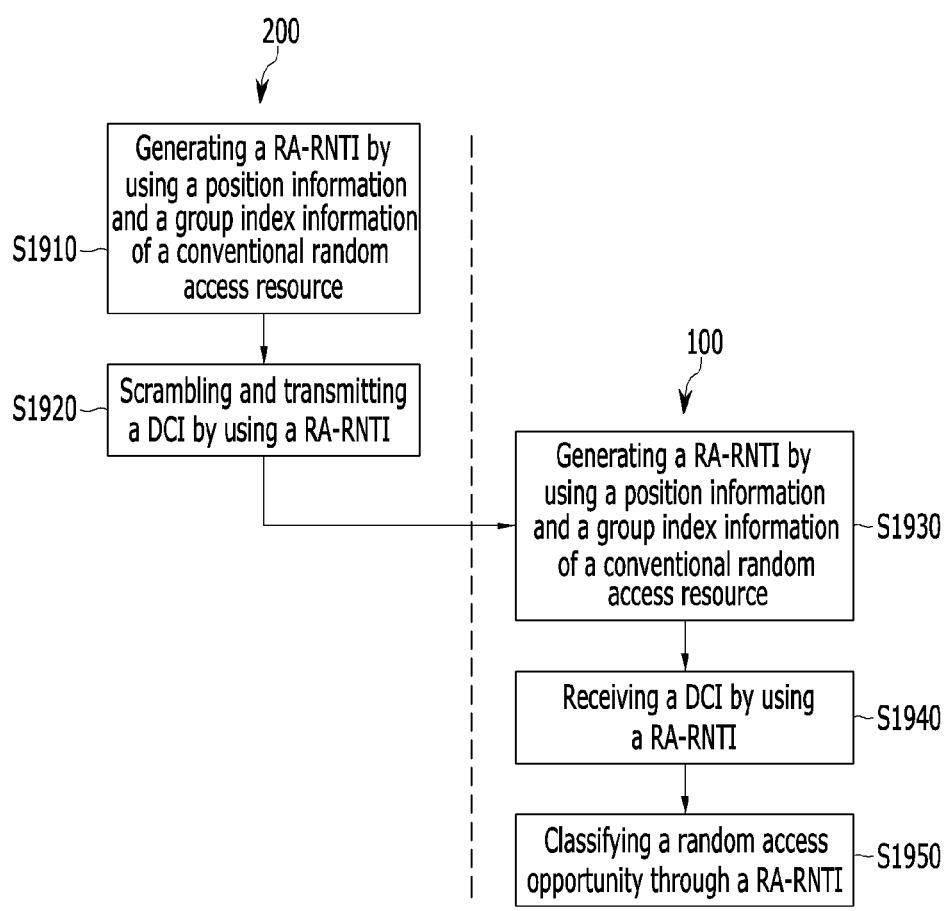
FIG. 19 is a view explaining a method for classifying a random access opportunity changed by an RA-RNTI in a base station according to an exemplary embodiment of the present invention.

FIG. 19 is a view explaining a method for classifying a random access opportunity changed by an RA-RNTI in a base station according to an exemplary embodiment of the present invention.

Referring to FIG. 19, as the DCI is transmitted through the RA-RNTI, the base station 200 may classify the changed random access opportunity.

The base station 200 transmits the random access response message to the terminal in response to the successfully received random access preamble. In this case, to inform the information such as the position of the data that the random access response message is allocated, the base station 200 transmits the DCI through the downlink control channel, and the DCI is scrambled using the RA-RNTI that is commonly generated by the base station 200 and the terminal 100 to be transmitted to confirm the terminal 100 performing the random access.

The terminal 100 and the base station 200 generate the RA-RNTI by using the position of the random access resource transmitting the random access preamble by the terminal 100, for example, the time (a subframe) and a frequency position as a variable when guiding the RA-RNTI. Accordingly, the base station 200 and the terminal 100 may classify the terminal 100 transmitting the random access preamble to the random access resource from each other through the RA-RNTI.

In an exemplary embodiment of the present invention, when generating the RA-RNTI, the base station 200 and the terminal 100 use the additional information to classify the terminal 100 performing the random access through the increased random access opportunity (the number of random access preambles and the random access resource through the secondary PRACH) as well as the terminal 100 performing the random access through the conventional random access resource.

The base station 200 and the terminal 100 generate the conventional random access resource and the changed random access resource into the group of a specific unit (e.g., a 64 random access preamble unit). Here, the group is used to easily provide the generating procedure of the RA-RNTI, and the base station 200 may actually set and use the group for easy management depending on the terminal applications and the terminal type. For example, when the base station 200 using the 64 random access preambles increases the random access preambles by 64 without setting the secondary PRACH, the conventional 64 random access preambles may be set as the group index 0, and the added 64 random access preambles may be set as the group index 1.

Also, when the base station 200 increases the random access preambles by 64 and sets the secondary PRACH, the base station 200 sets the 64 random access preambles of the conventional random access resource as the group index 0, the added 64 random access preambles in the conventional random access resource as the group index 1, the 64 random access preambles of the secondary random access resource as the group index 2, and the added 64 random access preambles in the secondary random access resource as the group index 3, thereby being classified into a total of four group.

It is set that the classifying through the group index is possible depending on the random access opportunity by this method.

The base station 200 generates the RA-RNTI by using the position information and the group index information of the conventional random access resource (S1910). The base station 200 may generate the RA-RNTI through Equation 5. In this case, the RA-RNTI is generated to not overlap the RA-RNTI depending on the change of the position information of the random access resource and the change of the group index.

$$RA\text{-}RNTI = 1 + t\_ID + 10 * f\_ID + 10 * g\_ID \quad \text{(Equation 5)}$$

Here, $t\_ID$ represents the subframe index of the random access resource transmitting the random access preamble by the terminal, and $f\_ID$ represents the index of the frequency domain in the random access resource transmitting the random access preamble by the terminal. In the case of the FDD system, the $f\_ID$ is not used. Also, $g\_ID$ means the group index according to the random access resource transmitting the random access preamble, or to the random access preamble.

The base station 200 scrambles the DCI for the random access response message by using the generated RA-RNTI to be transmitted (S1920).

The terminal 100 also generates the RA-RNTI by the method like Equation 5 (S1930).

The terminal 100 receives the DCI by using the RA-RNTI (S1940).

The terminal 100 may classify the changed random access opportunity as well as the conventional access opportunity through the RA-RNTI (S1950).

Figure 20:
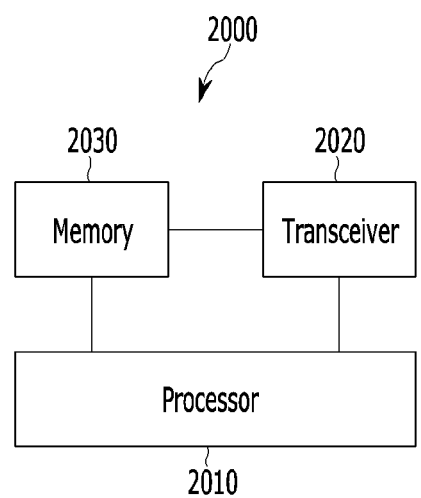
FIG. 20 is a view showing a random access opportunity control apparatus according to an exemplary embodiment of the present invention.

FIG. 20 is a view showing a random access opportunity control apparatus according to an exemplary embodiment of the present invention.

Referring to FIG. 2, the random access opportunity control apparatus 2000 includes a processor 2010, a transceiver 2020, and a memory 2030. The random access opportunity control apparatus 2000 may be realized in the base station 200.

The processor 2010 may be realized to perform the operations and functions of the base station 200 described in FIG. 1 to FIG. 19.

The transceiver 2020 is connected with the processor 2010 to transmit or receive the wireless signal with the terminal 100.

The memory 2030 stores instructions performed in the processor 2010 or loads the instructions from a storing apparatus (not shown) to be temporarily saved, and the processor 2010 may execute the instructions that were stored or loaded in the memory 2030. Also, the memory 2030 may store information required to execute the functions of the base station 200 described in FIG. 1 to FIG. 19 through the processor 2010.

The processor 2010 and the memory 2030 are connected to each other through a bus (not shown), and an input/output interface (not shown) may also be connected to the bus. In this case, the transceiver 2020 is connected to the input/output interface, and a peripheral apparatus such as an input apparatus, a display, a speaker, or a storing apparatus may be connected thereto.

According to an exemplary embodiment of the present invention, in a mobile communication system, the collision between the random access preamble that may be generated when performing the random access to access a plurality of terminals to the base station, the collision between the scheduled transmission message, and the random access congestion situation due to the random access collision probability increase may be dynamically improved.

The above-mentioned exemplary embodiments of the present invention are not embodied only by an apparatus and/or method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling a random access opportunity for a random access of a terminal to a base station, comprising:
a step of inferring a random access failure rate according to a random access collision of terminals performing random access using one of a plurality of random access preambles designated in the base station and one of a plurality of physical random access channels defined by the base station;
a step of controlling a random access opportunity of the terminal that fails the random access by using the random access failure rate of each terminal; and
a step of transmitting information for the controlled random access opportunity to the terminal that fails the random access,
wherein the controlling step includes:
a step of calculating the random access transmission rate corresponding to a number of terminals performing the random access by using the one random access channel and the one random access preamble, and
a step of controlling the random access opportunity to minimize the random access failure rate based on the random access transmission rate.

2. The method of claim 1, wherein the controlling step includes a step of changing at least one among a value of the random access preamble, a number of random access preambles, and a random access resource.

3. The method of claim 1, wherein the inferring step includes:
a step of inferring a collision probability of the random access preamble transmitted by each terminal; and
a step of inferring the random access failure rate of each terminal based on the collision probability of the random access preamble transmitted by each terminal.

4. The method of claim 1, wherein the inferring step includes:
a step of transmitting a random access response message to at least one terminal transmitting the successfully detected random access preamble; and
a step of inferring the random access failure rate of each terminal by using the resource allocated to transmit the scheduled transmission message by at least one terminal and the scheduled transmission message transmitted through the allocated resource by at least one terminal.

5. The method of claim 1, wherein the inferring step includes:
a step of allocating the random access preamble for the collision check to each terminal to confirm the random access collision to be transmitted by the terminal that fails the random access; and
a step of inferring the random access failure rate of the terminal transmitting the random access preamble for the collision check through the detection of the random access preamble for the collision check.

6. The method of claim 1, wherein the inferring step includes:
a step of allocating the random access resource for the collision check to each terminal to transmit the random access preamble by the terminal that fails the random access; and
a step of inferring the random access failure rate of the terminal transmitting the random access preamble through the detection of the random access preamble in the random access resource for the collision check.

7. The method of claim 1, wherein the inferring step includes:
a step of receiving the random access failure information from the terminal that fails the random access; and
a step of inferring the random access failure rate of the terminal through the random access failure information.

8. The method of claim 1, wherein the transmitting step includes:
a step of transmitting a paging message including the random access opportunity control indicator representing the random access opportunity control existence to the corresponding terminal; and
a step of transmitting a system information message including the control information for how the random access opportunity is controlled to the corresponding terminal.

9. The method of claim 1, wherein the transmitting step includes a step of transmitting the system information message including the information for the controlled random access opportunity to the corresponding terminal, and the information for the controlled random access opportunity includes at least one among secondary PRACH configuration information, the random access opportunity control indicator representing the random access opportunity control existence, and the control information for how to control the random access opportunity.

10. The method of claim 1, wherein the transmitting step includes a step of adding the information for the controlled random access opportunity to downlink control information (DCI) for the random access response message or the contention resolution message to be transmitted.

11. The method of claim 1, wherein the transmitting step includes a step of adding the information for the controlled random access opportunity to the downlink data represented by the DCI that is successfully received by using a predetermined RNTI (radio network temporary identifier).

12. The method of claim 1, wherein the transmitting step includes a step of including the information for the random access opportunity with the contention resolution message to be transmitted, and the contention resolution message further includes the identifier of the terminal allowing the access and the uplink resource allocation information.

13. The of claim 1, further comprising a step of transmitting classification information to classify the conventional random access opportunity used by the terminal for the random access and the controlled random access opportunity.

14. The method of claim 13, wherein the transmitting step of transmitting the classification information includes a step of transmitting the random access response message to at least one terminal transmitting the successfully detected random access preamble, the random access response message includes at least one MAC sub-header and at least one MAC RAR (random access response) indicated by at least one MAC sub-header, and the classification information expands and represents a reserved bit of the MAC RAR or the MAC sub-header.

15. The method of claim 13, wherein the step of transmitting the classification information to each terminal includes:
a step of transmitting the random access response message to at least one terminal transmitting the successfully detected random access preamble; and
a step of transmitting the downlink control information for the random access response message to at least one terminal, and one of the downlink control information and the MAC sub-header of the random access response message includes the classification information.

16. The method of claim 13, wherein the step of transmitting the classification information to each terminal includes:
   a step of generating an RA-RNTI by using the information for the conventional random access opportunity and the classification information; and
   a step of scrambling the random access response message by using the RA-RNTI to be transmitted to at least one terminal transmitting the successfully detected random access preamble.

17. An apparatus controlling a random access opportunity for a random access of a terminal in a base station, comprising:
   a processor inferring a random access failure rate depending on a random access collision of terminals performing the random access using one of a plurality of random access preambles designated in the base station and one of a plurality of physical random access channels defined by the base station and controlling the random access opportunity of the terminal that fails the random access by using the random access failure rate of each terminal; and
   a transceiver transmitting information for the controlled random access opportunity to the terminal that fails the random access,
   wherein the processor calculates the random access transmission rate corresponding to a number of terminals performing the random access by using the one random access channel and the one random access preamble, and controlling the random access opportunity to minimize the random access failure rate based on the random access transmission rate.

18. The apparatus of claim 17, wherein the processor generates classification information to classify the conventional random access opportunity used by the terminal for the random access and the controlled random access opportunity, and the transceiver transmits the classification information.

* * * * *